Nov. 28, 1933.     J. WAHRHAFTIG ET AL     1,936,892

AUTOMOBILE MOTOR AND BODY SUPPORTING CONSTRUCTION

Filed June 15, 1932

INVENTORS
Joseph Wahrhaftig and
BY Daniel G. Cullen

ATTORNEY

Patented Nov. 28, 1933

1,936,892

UNITED STATES PATENT OFFICE 1,936,892

AUTOMOBILE MOTOR AND BODY SUPPORTING CONSTRUCTION

Joseph Wahrhaftig, San Francisco, Calif., and Daniel G. Cullen, Detroit, Mich., assignors of twenty-two per cent to Abraham J. Levin, Franklin, Mich., and twenty-two per cent to James C. Bequette, Los Angeles, Calif.

Application June 15, 1932. Serial No. 617,290

2 Claims. (Cl. 180—55)

This invention relates to an automobile motor and body supporting construction and has for its principal object the provision of a construction wherein the motor and body are mounted on separate frames.

There has recently been produced a construction wherein the motor is spring supported with respect to the frame, the body, however, being fixedly mounted on the main frame of the vehicle. As contradistinguished from the foregoing, the construction of the present application includes two independent frames, each connected to and supporting the other, each independently supported on the axle housings of the vehicle, one of the frames supporting the motor and the other supporting the body.

Other objects of the invention will appear upon reference to the following detailed description of a preferred embodiment and to the appended drawing showing the same. In the drawing, Figure 1 shows in side elevation a skeletonized embodiment of the invention;

Figure 1:
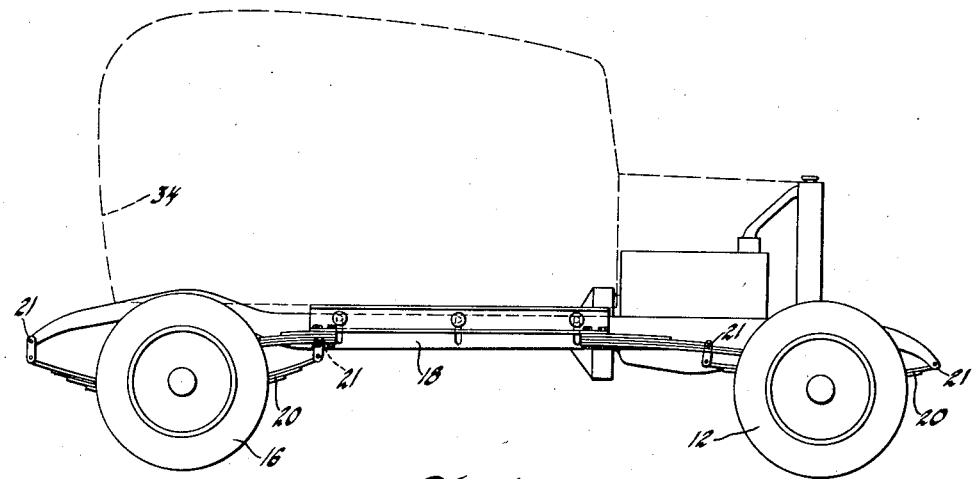
Figure 2:
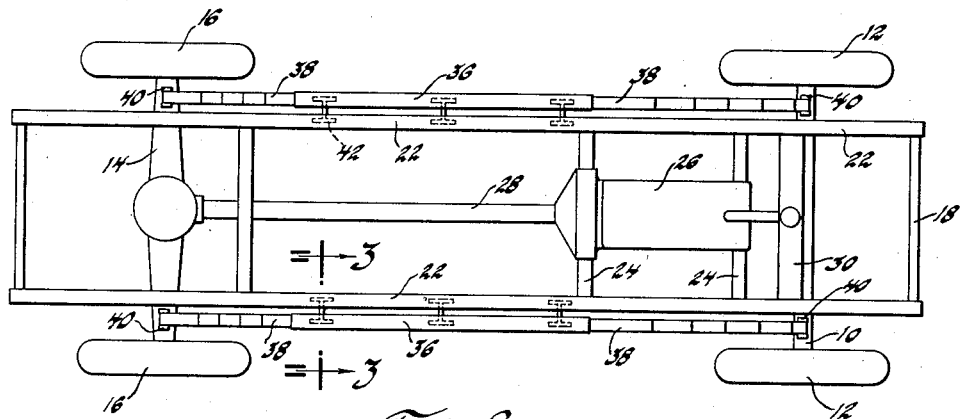
Fig. 2 is a skeleton plan view of the same.

Referring to the drawing, it will be seen that the construction includes a front axle 10 having wheels 12, a rear axle housing 14 having wheels 16, and a main frame 18 supported on and connecting the front axle and rear axle housing. The main frame is preferably rectangular in shape and is connected to and supported on the axle and axle housing by elongated springs 20 fixed at their ends to the side members 22 of the main frame through shackles 21. The springs 20, intermediate their ends, and in a manner not shown, are connected to and supported on the axle and axle housing.

Connecting the side members 22 of the main frame 18 and extending transversely thereof are cross struts 24 upon which the motor 26 of the vehicle may be supported in any desired fashion, springs, cushioning blocks of rubber or the like, etc., being provided if desired. The rear end of the motor is connected to the rear axle housing through the usual torque tube 28 and in front of the motor and supported upon the main frame is the usual radiator 30.

The construction thus far described is more or less conventional and except as necessary for an understanding of the invention, forms no specific part of the same.

Figure 3:
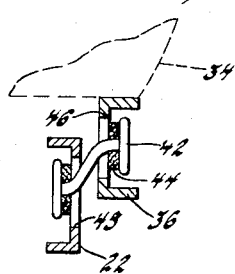
Fig. 3 is a detail section on line 3—3 of Fig. 2.

For supporting the vehicle body 34, shown in dotted lines, there is provided a secondary frame including side members 36 to whose ends are connected elongated springs 38, these springs having their free ends connected to and supported on the front axle 10 and the rear axle housing 14 by means indicated at 40, such means in particular being relatively conventional. The secondary frame pieces have their upper surfaces slightly above the upper surface of the main frame members 22 and the body 34 rests thereon, substantially as indicated in Fig. 3.

In order to prevent excessive, lateral, relative movement between the main frame side members 22 and the secondary frame members 36, connectors 42 might well be provided. These have headed ends, cushioned on rubber blocks 44, and pass through vertical slots 45 and 46 in the frame members 22 and 36, the slotted construction permitting relative vertical movement between the frame parts 22 and 36.

It will be observed that the construction disclosed permits the body to float with respect to the axles, to the main frame, and to the motor, and that riding comfort as well as freedom from damaging vibration is insured. Further it will be observed that the construction disclosed differs from any now known, wherein the body is fixed to the motor supporting main frame, in that the body is fixed to a secondary frame, independent although connected to the main frame, the latter, as is usual, supporting the motor.

Now having described the invention, and an illustrated embodiment of the same reference will be had to the following claims which define the scope of the invention.

What I claim is:

1. In automobile construction, the combination of front and rear axles, relatively independent engine and body frames resiliently and independently supported on said axles, and means disposed along adjacent side portions of said frames, at numerous longitudinally spaced points, connecting them and thereby restraining relative lateral movement of said frames while permitting relative vertical movement of said frames, said means comprising members passing through alined vertical slots in the frame side portions and having headed ends between which and the frame side portions are disposed resilient cushions.

2. In automobile construction, the combination of front and rear axles, relatively independent engine and body frames resiliently and independently supported on said axles, and means disposed along adjacent portions of said frames, connecting them and thereby restraining relative lateral movement of said frames while permitting relative vertical movement of said frames, said means comprising members passing through alined vertical slots in frame portions and having headed ends between which and the frame portions are disposed resilient cushions.

JOSEPH WAHRHAFTIG.
DANIEL G. CULLEN.